United States Patent [19]

Jonsson et al.

[11] Patent Number: 5,529,739

[45] Date of Patent: Jun. 25, 1996

[54] PROCESS FOR THE PRODUCTION OF MOLDED PRODUCTS USING INTERNAL MOLD RELEASE AGENTS

[75] Inventors: Erik H. Jonsson, Coraopolis, Pa.; Harald Pielartzik, Krefeld, Germany; Kristen L. Parks, Wexford; Randall C. Rains, Pittsburgh, both of Pa.

[73] Assignee: Bayer Corporation, Pittsburgh, Pa.

[21] Appl. No.: 339,854

[22] Filed: Nov. 15, 1994

[51] Int. Cl.$^6$ .................................................. B29C 45/83
[52] U.S. Cl. ................ 264/300; 264/328.6; 264/328.18; 264/331.19; 521/128
[58] Field of Search ............................. 264/300, 328.2, 264/328.6, 328.18, 331.19; 521/128; 536/53

[56] References Cited

U.S. PATENT DOCUMENTS

| | | | |
|---|---|---|---|
| 2,438,091 | 3/1948 | Lynch | 536/53 |
| 3,726,952 | 4/1973 | Boden et al. | 264/48 |
| 4,058,492 | 11/1977 | von Bonin et al. | 260/2.5 AM |
| 4,098,731 | 7/1978 | von Bonin et al. | 521/51 |
| 4,111,861 | 9/1978 | Godlewski | 521/123 |
| 4,201,847 | 5/1980 | Kleimann et al. | 521/172 |
| 4,237,268 | 12/1980 | Walz et al. | 536/4 |
| 4,254,228 | 3/1981 | Kliemann et al. | 521/128 |
| 4,499,254 | 2/1985 | Dominguez et al. | 528/49 |
| 4,519,965 | 5/1985 | Taylor et al. | 264/51 |
| 4,575,518 | 3/1986 | Rasshofer et al. | 521/128 |
| 4,581,386 | 4/1986 | Taylor et al. | 521/125 |
| 4,585,803 | 4/1986 | Nelson et al. | 521/105 |
| 4,764,537 | 8/1988 | Horn et al. | 521/51 |
| 4,868,224 | 9/1989 | Harasin et al. | 521/124 |
| 4,946,922 | 8/1990 | Reisch et al. | 264/328.6 |
| 5,019,317 | 5/1991 | Slocum et al. | 264/300 |
| 5,126,170 | 6/1992 | Zwiener et al. | 427/385.5 |
| 5,128,087 | 7/1992 | Slocum et al. | 264/300 |
| 5,151,483 | 9/1992 | Harasin et al. | 264/257 |
| 5,182,034 | 1/1993 | Meyer et al. | 264/300 |
| 5,243,012 | 9/1993 | Wicks et al. | 528/58 |
| 5,244,613 | 9/1993 | Hurley et al. | 264/328.6 |
| 5,389,696 | 2/1995 | Dempsey et al. | 521/128 |
| 5,391,344 | 2/1995 | Rains et al. | 264/328.6 |
| 5,399,310 | 3/1995 | Payne et al. | 264/328.6 |

FOREIGN PATENT DOCUMENTS

| | | |
|---|---|---|
| 2101140 | 1/1983 | United Kingdom . |
| 2144136 | 2/1985 | United Kingdom . |

*Primary Examiner*—Jeffrey R. Thurlow
*Attorney, Agent, or Firm*—Joseph C. Gil

[57] ABSTRACT

The present invention is directed to an improved internal mold release system for the production of high density molded SRIM parts, i.e. molded parts having a density of from 1.3 to 2.0 g/cc. In particular, the process involves reacting a reaction mixture comprising an organic polyisocyanate and at least one organic compound containing isocyanate-reactive hydrogens in the presence of a catalyst and an internal mold release agent in a closed mold. The internal mold release agent is a compound corresponding to the formula:

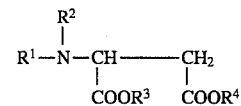

wherein $R^2$ represents hydrogen, the group $R^5$—NH—CO—, or a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, and wherein $R^1$, $R^3$, $R^4$ and $R^5$ may be the same or different and represent a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, with the proviso that at least one of $R^1$, $R^2$, $R^3$, $R^4$ and $R^5$ is a $C_{12}$ to $C_{24}$ alkyl or substituted alkyl group, or a $C_{12}$ to $C_{24}$ alkenyl or substituted alkenyl group, and with the further proviso that substituent groups are inert toward isocyanate groups at temperatures of 100° C. or less.

3 Claims, No Drawings

PROCESS FOR THE PRODUCTION OF MOLDED PRODUCTS USING INTERNAL MOLD RELEASE AGENTS

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases; i) mixtures of aliphatic or aryl carboxylic acid and a polar metal compound; ii) carboxyalkyl-siloxanes; iii) aliphatic glyoximes; and iv) aralkyl ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731). Zinc carboxylates containing from 8 to 24 carbon atoms per carboxylate group have also been described (U.S. Pat. Nos. 4,519,965, 4,581,386, 4,585,803 and 4,764,537, and British Patent 2,101,140). Release agents containing zinc carboxylates in combination with primary or secondary amine compatibilizers and an organic material containing a carboxylic acid group, a phosphorous containing acid group or a boron containing acid group, are described in published European Patent Application 0,119,471.

Recently, a system which provides release from a bare metal mold has been developed. The system utilizes the reaction product of an organic polyisocyanate and an active hydrogen containing fatty acid ester in the A-side and a zinc carboxylate in the B-side (see, U.S. Pat. No. 4,868,224). One problem with this system is that the zinc carboxylate/solubilizer combination catalyzes the hydroxyl/isocyanate reaction. This makes the system relatively fast, leading to difficulties in filling large molds. It is known to add fatty acids to polyurea systems in order to increase the green strength and aid in mold release (see, U.S. Pat. No. 4,499,254). Another known system which releases from bare metal molds is disclosed in U.S. Pat. No. 5,019,317. It uses a similar isocyanate/fatty acid ester reaction product and zinc carboxylate combination as described hereinabove to produce a molded product.

U.S. Pat. Nos. 5,126,170 and 5,243,012 discloses coating materials which contain polyaspartic acid derivatives.

The present invention is directed to molded products made using certain aspartic acid derivatives as internal mold release agents.

DESCRIPTION OF THE INVENTION

The present invention is directed to an improved internal mold release system for the production of relatively high density SRIM molded parts, i.e. molded parts having a density of from 1.3 to 2.0 g/cc. In particular, the process comprises reacting a reaction mixture comprising an organic polyisocyanate and at least one organic compound containing isocyanate-reactive hydrogens in the presence of a catalyst and an internal mold release agent in a closed mold. The internal mold release agent is used in an amount of from 1 to 25% by weight (and preferably from 3 to 7% by weight) based upon the total weight of reaction mixture and comprises a compound corresponding to the formula:

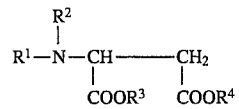

wherein $R^2$ represents hydrogen, the group $R^5$—NH—CO—, or a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, and wherein $R^1$, $R^3$, $R^4$ and $R^5$ may be the same or different and represent a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, with the proviso that at least one of $R^1$, $R^2$, $R^3$, $R^4$ and $R^5$ is a $C_{12}$ to $C_{24}$ alkyl or substituted alkyl group, or a $C_{12}$ to $C_{24}$ alkenyl or substituted alkenyl group, and with the further proviso that substituent groups are inert toward isocyanate groups at temperatures of 100° C. or less.

In the most preferred embodiment, the reaction mixture additionally comprises from 0 to 10% by weight, based on the weight of the reaction mixture, of a fatty acid. Preferably the reaction mixture contains from 2 to 7% by weight, based on the weight of the reaction mixture, of a fatty acid. Oleic acid is the preferred fatty acid.

In addition, the reaction mixture may comprise up to 70% by weight, based on the weight of the reaction mixture, of reinforcing agents, including mats and fillers. Both organic and inorganic reinforcing agents and fillers may be used. It is preferred that the reaction mixture comprise from 45 to 65% by weight, based on the weight of the reaction mixture, of reinforcing agents and/or fillers.

It has been found that the internal mold release agent described hereinabove gives excellent release from a variety of different mold surfaces, such as steel or aluminum. As is typical in the industry, an application of paste wax is applied to the surface of the mold. Conventional paste waxes are commercially available from Chem-Trend, Inc. One such example is RCT-C-2080. The paste wax fills the pores of the tool and forms a barrier coat to keep the urethane from sticking to the tool. It is necessary to apply one spray of external mold release to the surface of the mold prior to molding the first part. This external mold release may be either a water or a wax based release agent. Typically, this will enable the easy release of at least 20 parts from the mold.

The aspartic acid derivatives useful herein and their method of manufacture are known in the art. They may be synthesized from dialkyl maleates and primary or secondary fatty chain monoamines in a Michael-type reaction according to following reaction scheme (the scheme shows the reaction between a dialkyl maleate and a primary amine):

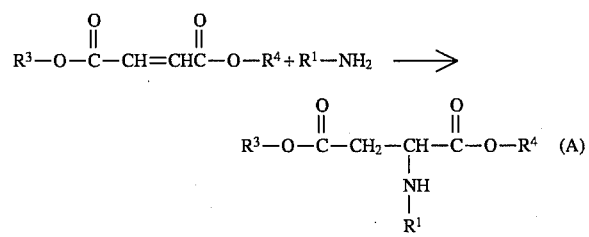

In order to produce the compounds where $R^2$ is the group $R^5$—NH—CO—, the product is reacted with a monoisocyanate. U.S. Pat. Nos. 2,438,091 and 4,237,268 and Japanese patent 05140059 describe methods of making compounds falling within the above formula.

Suitable fatty acids to be used in the reaction mixture in addition to the internal mold release agent described hereinabove, include, for example, fatty acids such as those described in U.S. Pat. No. 4,499,254, incorporated herein by reference. Typical are those acids presented by the formula: $R(CO_2H)_n$, wherein n is 1, 2, or 3 and where R contains at least 10 carbon atoms. R may be alkyl (i.e. cyclic, linear, or branched), alkaryl, aralkyl, or aryl, saturated or unsaturated. Examples of useful acids include, for example, n-decanoic acid, neodecanoic acid, lauric acid, palmitic acid, stearic acid, isostearic acid, oleic acid, linoleic acid, and the like. The fatty acid can be used in the B-side of the reaction mixture. It is simply mixed with the particular component prior to use. The relative amounts of fatty acid used are as described hereinabove. Oleic acid is the preferred fatty acid.

Starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401, 190), 2,4- and 2,6-hexahydro-tolylene diisocyanate and mixtures of these isomers. Hexahydro-1,3- and/or -1,4-phenylene diisocyanate; perhydro-2,4'- and or -4,4'-diphenylmethane diisocyanate; 1,3- and 1,4-phenylene diisocyanate; 1,4- and 2,5-tolylene diisocyanate and mixtures of these isomers are also suitable in the instant invention. Diphenylmethane- 2,4- and/or -4,4'-diisocyanate; naphthylene-1,5-diisocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902, 007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929, 034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic cycloaliphatic isocyanates are less suitable for the purpose of the instant invention.

Also preferred are the polyphenyl-polymethylene polyisocyanates obtained by the phosgenation of an aniline/formaldehyde condensate. Where reinforcing fiber mats are used, it is particularly preferred that such polyisocyanates have viscosities of 200 mPa.s or less at 25° C.

Also necessary for preparing the molded product of the present invention is an isocyanate reactive component. Generally, isocyanate reactive compounds include, for example, organic compounds containing hydroxyl groups or amine groups. It is generally preferred to include hydroxyl group containing compounds. These materials may be typically divided into two groups, high molecular weight compounds having a molecular weight of 500 to 10,000 and low molecular weight compounds having a molecular weight of 62 to 499. These low molecular weight compounds are commonly referred to as chain extenders. Examples of suitable high molecular weight compounds include the polyesters, polyethers, polythioethers, polyacetals and polycarbonates containing at least 2, preferably 2 to 8 and most preferably 2 to 4 hydroxyl groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. Polyethers modified by vinyl polymers, of the type formed, for example, by polymerizing styrene or acrylonitrile in the presence of polyether (U.S. Pat. Nos. 3,383,351); 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found for example in High Polymers, Volume XVI, "Polyurethanes, Chemistry and Technology", by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl-Hanser-Verlag, Munich, 1966, pages 45–71.

In accordance with the present invention, the high molecular weight compounds can be used in a mixture with low molecular weight polyols. Examples of suitable hydroxyl group-containing polyols include ethylene glycol, 1,2- and 1,3-propylene diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl- 3,5-diethyl-1,2,4-diamino benzene, 1-methyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl- 5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino-diphenyl-methane, 1,2- and 1,4-phenylene diamine, naphthalene-1,5-diamine and triphenylmethane-4, 4'-4"-triamine. The trifunctional and polyfunctional aromatic amine compounds may also exclusively or partly contain secondary amino groups such as 4,4'-di-(methylamino)-diphenylmethane or 1-methyl- 2-methylamino-4-amino-benzene. Liquid mixtures of polyphenyl polymethylene-polyamines, of the type obtained by condensing aniline with formaldehyde, are also suitable. Generally, the non-sterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

The reaction mixture used in the present invention should also include catalysts.

Suitable catalysts which may be used in the present invention include catalysts such as, for example, various organic metal compounds, including, for example, tin(II) salts of carboxylic acids, dialkyl tin salts of carboxylic acids, dialkyl tin mercaptides, dialkyl tin dithioesters and tertiary amines, such as, for example, dimethylcyclo-hexylamine (i.e. Polycat 8), pentamethyldiethylenetriamine (i.e. Polycat 5), bis[2-(dimethylamino)ethyl]ether (Niax A-1), dimethylethanolamine (DMEA), Dabco WT, etc. Of course, it is also possible to use any of the catalysts which are well known to those skilled in the art of polyurethane chemistry. It is preferred to use tertiary amines as the catalysts in the present invention.

The process of the present invention is a typical SRIM, i.e. structural reaction injection molding process. The SRIM process is the same as a conventional RIM process, except that it requires a reinforcing mat to be placed in the mold cavity prior to the introduction of the reaction mixture.

Reinforcing mats which are also useful in this invention comprise, for example, glass mats, graphite mats, polyester mats, polyaramide mats such as, for example, KEVLAR mats, and mats made from any fibrous material. Also, this includes, for example, random continuous strand mats made of glass fiber bundles, woven mats and oriented mats such as, for example, uniaxial or triaxial mats.

In addition to the hereinabove described reinforcing mats, it is also to possible to use additional fillers and reinforcing agents in the present invention. These may be included in the reaction mixture by mixing with one or both components, i.e. the isocyanate component and/or the isocyanate-reactive component, prior to mixing the components via the RIM process.

Suitable fillers and reinforcing agents which may be included in the reaction mixture as described hereinabove include both organic and inorganic compounds. These inorganic compounds include, for example, compounds such as glass in the form of fibers, flakes, cut fibers, or microspheres; mica, wollastonite; carbon fibers; carbon black; talc; and calcium carbonate. Suitable organic compounds include, for example, expanded microspheres which are known and described in, for example, U.S. Pat. Nos. 4,829,094, 4,843, 104, 4,902,722, and 4,959,395, the disclosures of which are herein incorporated by reference, and Applicants copending U.S. application Ser. No. 08/006,560 filed on Jan. 21, 1993, now U.S. Pat. No. 5,244,613 the disclosure of which is herein incorporated by reference. These include commercially available microspheres such as, for example, Dualite M6017AE, Dualite M6001AE, and Dualite M6029AE, all of which are available from Pierce & Stevens Corporation, and Expandocel which is available from Nobel Industries.

In addition to the catalysts and fillers and reinforcing agents, other additives which may also be used in the reaction mixture to form the molding compositions of the present invention include, for example, the known cell regulators, flame retarding agents, plasticizers, dyes, blowing agents, surface-active agents, etc.

Suitable surface-active additives include compounds such as, for example, emulsifiers and foam stabilizers. Some suitable surface-active additives include compounds such as, for example, N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salt of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additives which are to be included.

The invention is further illustrated but is not intended to be limited by the following examples in which all parts and percentages are by weight unless otherwise specified.

EXAMPLES

Preparation of release agent:

RELEASE AGENT A: 7800 parts by weight of oleylamine were charged to a reaction vessel under a nitrogen blanket. Under the nitrogen blanket, 5010 parts by weight of diethylmaleate were slowly added to the vessel at 60° C., care being taken that the temperature in the vessel did not exceed 80° C. After the addition was complete, the temperature was raised to 80° C. and the reaction mixture was stirred at that temperature for 4 hours under nitrogen blanket. Vacuum (1 to 3 mmHg) was applied, the mixture heated to 80° C. and stirred for another two hours.

RELEASE AGENT B: 800 parts by weight of RELEASE AGENT A was added to a reaction vessel. 178 parts by weight of butyl isocyanate were added dropwise to the vessel under a nitrogen blanket. The temperature was maintained at or below 30° C. After the addition was complete, the reaction mixture was stirred at room temperature for 3 hours. Vacuum (1 to 3 mmHg) was slowly applied until gas formation ceased.

SRIM Examples:

The polyurethane system used was a typical RIM 2-component system. The A-side was a polymeric diphenylmethane diisocyanate and is described hereinbelow. The B-side was a mixture of polyols and other organic compounds containing isocyanate-reactive hydrogens, catalysts and the internal release agents of the invention. A Krauss-Maffei 10 mm mixhead was used. The following processing parameters were used):

| | |
|---|---|
| Throughput | 250 g/sec |
| Mix pressure (A/B) | 14 N/mm$^2$/14.7/mm$^2$ (2000 psi/2100 psi) |
| Demold time | 60 seconds |

A specified number (or quantity) of reinforcing mats was preplaced in the tool.

The temperature of both the A- and B-sides was about 32° (about 90° F.). Prior to beginning the trials, the surface of the 15 inch×15 inch by 0.125 inch (about 38 cm×38 cm×3 cm) polished P20 steel plaque mold used in each example was cleaned with Chem-Trend 201B mold cleaner (i.e. n-methyl pyrrolidone). The mold used in each example was buffed with Chem-Trend 2080 paste wax and lightly sprayed with Chem-Trend 2006 external release agent. The mold temperature in each example was maintained at approximately 79° C. (about 175° F.). No additional paste wax or external mold release was used after the molding of the first part in each example.

A successful release indicated no sticking or tearing of the molded part, and the part was removed from the mold without applying significant force.

The following materials were used:

Isocyanate: A commercially available polymethylene poly(phenyl isocyanate) having a isocyanate group content of about 32% by weight, and having a diisocyanate content of about 48% by weight. The diisocyanate comprises about 5% by weight of 2,4'-methylene bis(phenyl isocyanate) and about 43% by weight of 4,4'-methylene bis(phenylisocyanate).

Polyol A: an adduct of propylene glycol and propylene oxide, having a molecular weight of about 425 polyol B: an adduct of glycerin with a mixture of ethylene oxide and propylene oxide in about an 82:18% by weight to obtain a molecular weight of about 6010

Polyol C: an adduct of ethylene diamine with propylene oxide, having a molecular weight of about 350

SA-610/50: an acid-blocked 1,5-diazodicyclo (5.4.0) undec-5-ene delayed action catalyst; commercially available from Air Products PC-15 (Polycat 15): a tertiary amine with a reactive secondary amine catalyst; commercially available from Air Products.

The following B-side was used:

| | PBW |
|---|---|
| Polyol A | 29 |
| Polyol B | 25 |
| Polyol C | 24 |
| Ethylene Glycol | 22 |
| Oleic Acid | 5 |
| PC-15 | 0.35 |
| SA-610/50 | 1.5 |

Example 1

The mold was cleaned and buffed as described above. A total of 0.24 g/cm$^2$ (8 oz/sq.ft.) of OCF M-8610 continuous strand mat reinforcement, commercially available from Owens Corning Fiberglass, was placed inside the mold prior to introduction of the reactants and closing the mold. 5 parts by weight of RELEASE AGENT A was added to the B-side. The total system provided a 20 second gel time. The A-side and the B-side were then injected into the mold in a weight ratio of 146/100 (A-side/B-side) at an isocyanate index of 105. The system provided an average of 20 easy releases with no further application of external release agent. The average physical and mechanical properties of the 20 molded parts are shown in Table 1.

Example 2

The mold was cleaned and buffed as described above. A total of 0.24 g/cm² (8 oz/sq.ft.) of OCF M-8610 continuous strand mat reinforcement, commercially available from Owens Corning Fiberglass, was placed inside the mold prior to introduction of the reactants and closing the mold. 5 parts by weight of RELEASE AGENT B was added to the B-side. The total system provided a 19 second gel time. The A-side and the B-side were then injected into the mold in a weight ratio of 145/100 (A-side/B-side) at an isocyanate index of 105. This system also provided an average of 20 easy releases with no further application of external release agent. The average physical and mechanical properties of the 20 molded parts are shown in Table 1.

TABLE 1

|  | Example 1 | Example 2 |
|---|---|---|
| Density, g/cm³ | 1.59 | 1.56 |
| ASTM D792 lb/ft³ | 99.12 | 97.53 |
| Tensile Strength, mPa | 189 (±11) | 221 (±15) |
| ASTM D638 lb/in² | 27,340 (±1,558) | 32,100(±2,125) |
| Tensile Elongation, % ASTM D638 | 2.2 (±0.3) | 2.3 (±0.2) |
| Flexural strength, mPa | 325 (±13) | 311 (±57) |
| ASTM D790 lb/in² | 47,170 (±1,894) | 45,130 (±8,203) |
| Flexural Modulus, mPa | 11,559 (±158) | 10,931 (±2616) |
| /ASTM D790 lb/in² | 1,676,000 (±22,950) | 1,585,000 (±379,300) |
| HDT, °C. | 203 | 202 |
| °F. | 397 | 396 |
| ASTM D648 |  |  |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a SRIM molded part having a density of from 1.3 to 2.0 g/cc, by applying an external release agent to the surface of a mold, closing said mold, and reacting a reaction mixture comprising an organic polyisocyanate and at least one organic compound containing isocyanate-reactive hydrogens in the presence of a catalyst and an internal mold release agent in said closed mold, the improvement wherein said internal mold release agent comprises: a compound corresponding to the formula:

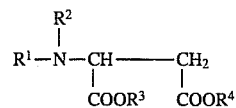

wherein $R^2$ represents hydrogen, the group $R^5$—NH—CO—, or a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, and wherein $R^1$, $R^3$, $R^4$ and $R^5$ may be the same or different and represent a $C_1$ to $C_{24}$ alkyl or substituted alkyl group, a $C_3$ to $C_{24}$ cycloalkyl or substituted cycloalkyl group, a $C_2$ to $C_{24}$ alkenyl or substituted alkenyl group, or a $C_6$ to $C_{24}$ aryl or substituted aryl group, with the proviso that at least one of $R^1$, $R^2$, $R^3$, $R^4$ and $R^5$ is a $C_{12}$ to $C_{24}$ alkyl or substituted alkyl group, or a $C_{12}$ to $C_{24}$ alkenyl or substituted alkenyl group, and with the further proviso that substituent groups are inert toward isocyanate groups at temperatures of 100° C. or less, and wherein said internal mold release agent is used in an amount of from 1.0 to 25% by weight, based on the weight of said reaction mixture.

2. The process of claim 1, wherein said reaction mixture additionally contains from 0 to 10% by weight, based on the weight of said reaction mixture, of oleic acid.

3. The process of claim 1, wherein said reaction mixture additionally contains up to 70% by weight, based on the weight of said reaction mixture, of a filler or reinforcing agent.

* * * * *